UNITED STATES PATENT OFFICE.

CHARLES C. WAINWRIGHT, OF BISHOP CREEK, CALIFORNIA.

IMPROVEMENT IN MEDICAL COMPOUNDS.

Specification forming part of Letters Patent No. 203,965, dated May 21, 1878; application filed March 6, 1878.

*To all whom it may concern:*

Be it known that I, CHARLES C. WAINWRIGHT, of Bishop Creek, county of Inyo, and State of California, have invented an Improved Medical Compound; and I do hereby declare the following to be a full, clear, and exact description thereof.

My invention relates to an improved medical compound possessed of tonic, diuretic, and stimulating properties, and without the deleterious effects of quinine in the blood; and it consists in the compound of ingredients, as hereinafter described and claimed, the American sage-brush being the principal element of the compound, which is made as follows:

Of the sage-brush take one pound; pulverized mandrake-root, four ounces; pulverized golden-seal root, four ounces.

Place the mixture in a suitable vessel, and pour on nine pints of water; boil until it is reduced to seven pints, and when cool filter and add eight drams of the fluid extract of nux vomica and sufficient alcohol to make the whole measure eight pints. It may then be bottled and labeled to suit convenience or taste.

Having thus described my invention, what I claim as new, and desire to secure by Letters Patent, is—

The compound herein described, consisting of wild sage-brush as a base, pulverized mandrake-root, pulverized golden-seal root, fluid extract of nux vomica, alcohol, and water, substantially as and in the proportions above set forth.

In witness whereof I have hereunto set my hand and seal.

CHARLES CUMBERSON WAINWRIGHT. [L. S.]

Witnesses:
   J. B. SWEARINGEN,
   WEBSTER HILTON WALKER.